US012643228B2

(12) United States Patent
Taniguchi et al.

(10) Patent No.: US 12,643,228 B2
(45) Date of Patent: Jun. 2, 2026

(54) ROBOT DATA PROCESSING SERVER AND ROBOT PROGRAM CALCULATION METHOD

(71) Applicant: KAWASAKI JUKOGYO KABUSHIKI KAISHA, Kobe (JP)

(72) Inventors: Ryusuke Taniguchi, Kobe (JP); Fumihiro Honda, Kobe (JP); Shoji Shimizu, Kobe (JP); Toshihiko Miyazaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 70 days.

(21) Appl. No.: 18/702,476

(22) PCT Filed: Oct. 21, 2022

(86) PCT No.: PCT/JP2022/039220
§ 371 (c)(1),
(2) Date: Apr. 18, 2024

(87) PCT Pub. No.: WO2023/068352
PCT Pub. Date: Apr. 27, 2023

(65) Prior Publication Data
US 2024/0399566 A1 Dec. 5, 2024

(30) Foreign Application Priority Data

Oct. 22, 2021 (JP) ................................. 2021-172878

(51) Int. Cl.
*B25J 9/16* (2006.01)
*G05B 19/4155* (2006.01)

(52) U.S. Cl.
CPC ........... *B25J 9/1605* (2013.01); *B25J 9/1664* (2013.01); *G05B 19/4155* (2013.01);
(Continued)

(58) Field of Classification Search
CPC ...... B25J 9/1671; B25J 9/1605; B25J 9/1664; B25J 13/089; B25J 13/06; B25J 9/0081;
(Continued)

(56) References Cited

U.S. PATENT DOCUMENTS 5,572,103 A * 11/1996 Terada .................... B25J 9/1656
901/3
2006/0069464 A1* 3/2006 Nagatsuka ........... G05B 19/425
700/253

(Continued)

FOREIGN PATENT DOCUMENTS

| JP | 2015-005093 A | 1/2015 |
| JP | 2017-199077 A | 11/2017 |
| JP | 2021-000678 A | 1/2021 |

*Primary Examiner* — Khoi H Tran
*Assistant Examiner* — Tanner L Cullen
(74) *Attorney, Agent, or Firm* — Oliff PLC

(57) ABSTRACT

A server includes a communication device, a storage device, and a processing unit. The communication device receives teaching points of an industrial robot from a client device by communicating with the client device via the wide area network. The storage device stores correction method data including a plurality of types of correction methods for correcting the teaching points according to a positional relationship between the robot and a workpiece during the work. The processing unit creates a correction program by applying the correction method described in the correction method data to the teaching points received by the communication device, and instructs the communication device to transmit the correction program to the client device.

7 Claims, 7 Drawing Sheets

(52) U.S. Cl.
CPC .............. *G05B 2219/36043* (2013.01); *G05B 2219/40519* (2013.01); *G05B 2219/50391* (2013.01)

(58) Field of Classification Search
CPC ......... B25J 9/1692; G05B 2219/39014; G05B 2219/39022; G05B 19/423; G05B 19/425; G05B 19/427
See application file for complete search history.

(56) References Cited

U.S. PATENT DOCUMENTS

| | | | |
|---|---|---|---|
| 2007/0213873 A1* | 9/2007 | Ban ........................ | B25J 9/1656 |
| | | | 700/245 |
| 2011/0015787 A1* | 1/2011 | Tsusaka ............... | G05B 19/423 |
| | | | 901/4 |
| 2011/0106304 A1* | 5/2011 | Nihei ..................... | B25J 9/1664 |
| | | | 901/3 |
| 2015/0019012 A1* | 1/2015 | Yoshida ................... | B25J 9/163 |
| | | | 700/248 |
| 2016/0008976 A1 | 1/2016 | Nagatsuka et al. | |
| 2017/0308052 A1 | 10/2017 | Kajiyama | |
| 2019/0291271 A1 | 9/2019 | Hayashi | |
| 2020/0398435 A1 | 12/2020 | Okura et al. | |
| 2021/0402598 A1* | 12/2021 | Terasawa ............... | B25J 9/1612 |
| 2023/0158687 A1* | 5/2023 | Fu ........................ | B25J 9/1664 |
| | | | 700/259 |

* cited by examiner

FIG. 1

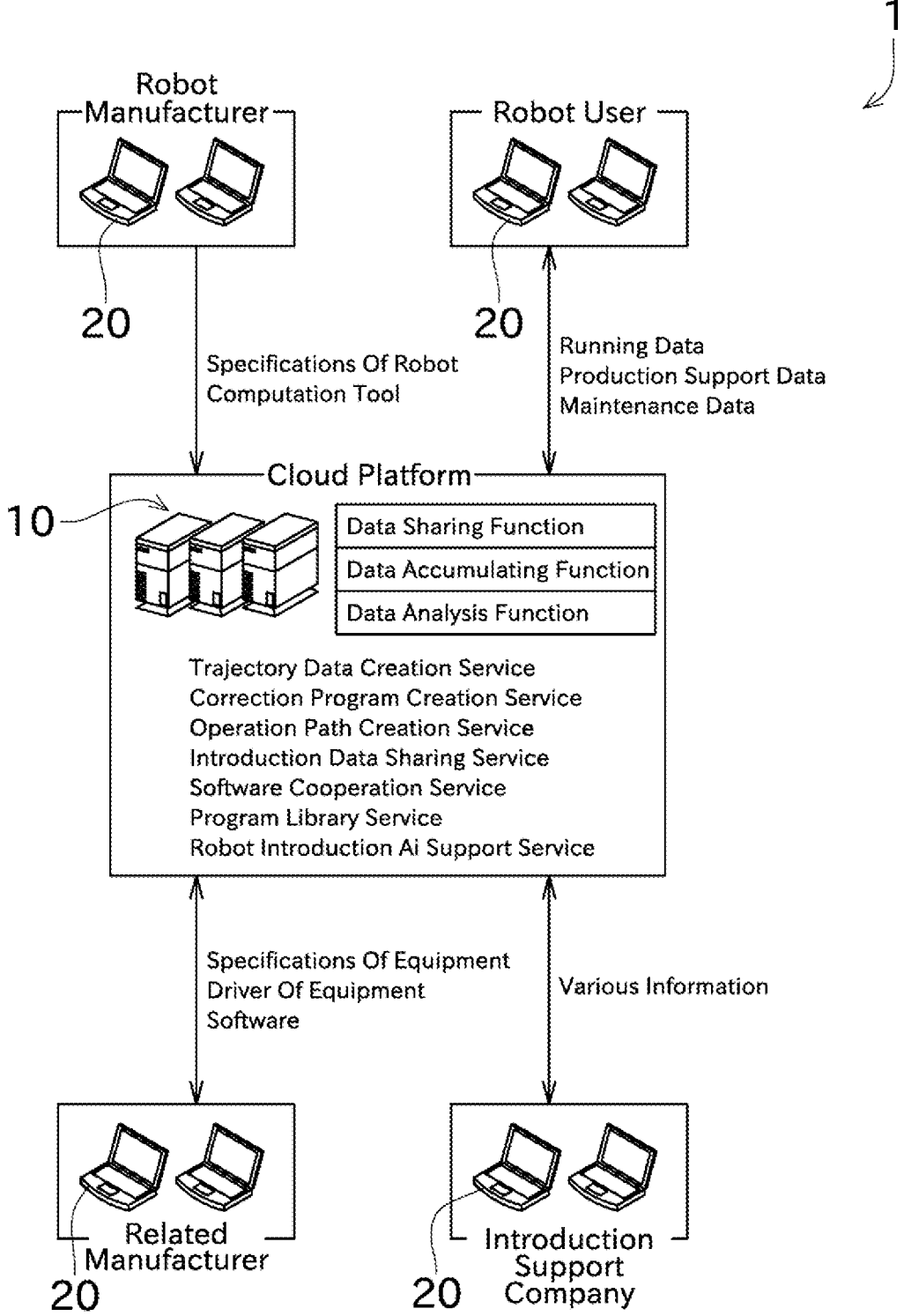

1

Robot Manufacturer

Robot User

20

20

Specifications Of Robot
Computation Tool

Running Data
Production Support Data
Maintenance Data

Cloud Platform

10

Data Sharing Function

Data Accumulating Function

Data Analysis Function

Trajectory Data Creation Service
Correction Program Creation Service
Operation Path Creation Service
Introduction Data Sharing Service
Software Cooperation Service
Program Library Service
Robot Introduction Ai Support Service Specifications Of Equipment
Driver Of Equipment
Software Various Information Related
Manufacturer

20

Introduction
Support
Company

20

FIG. 4
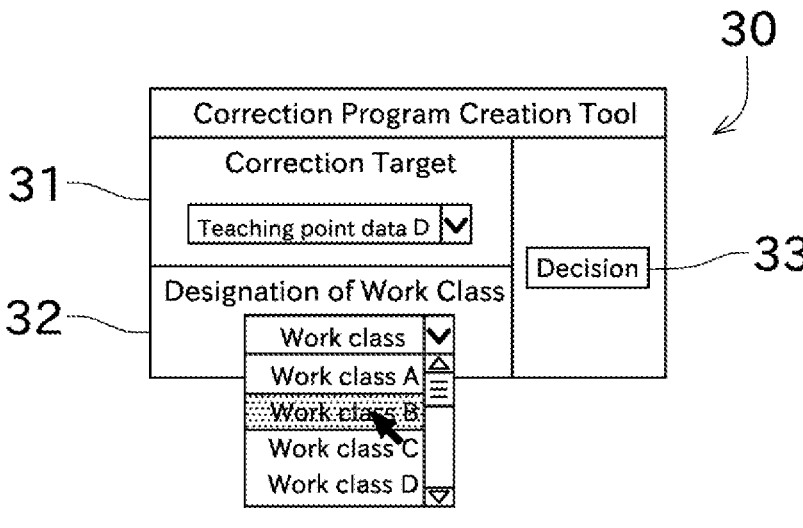
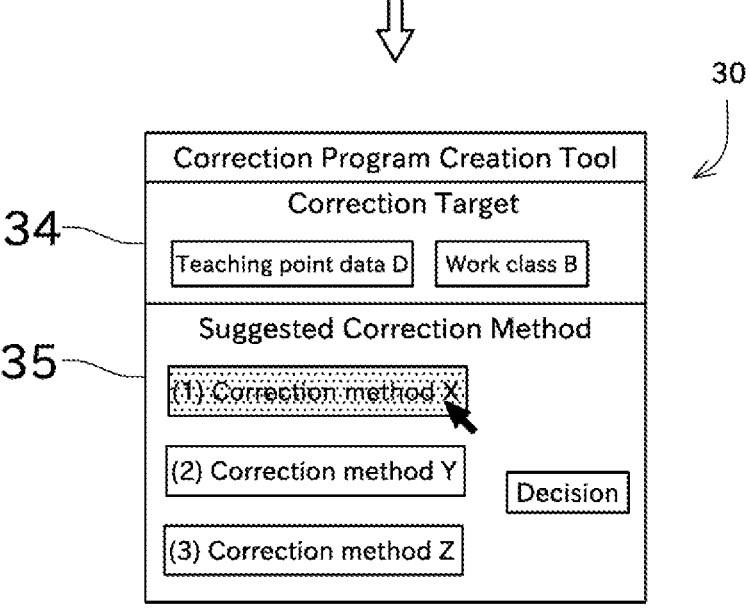

FIG. 5

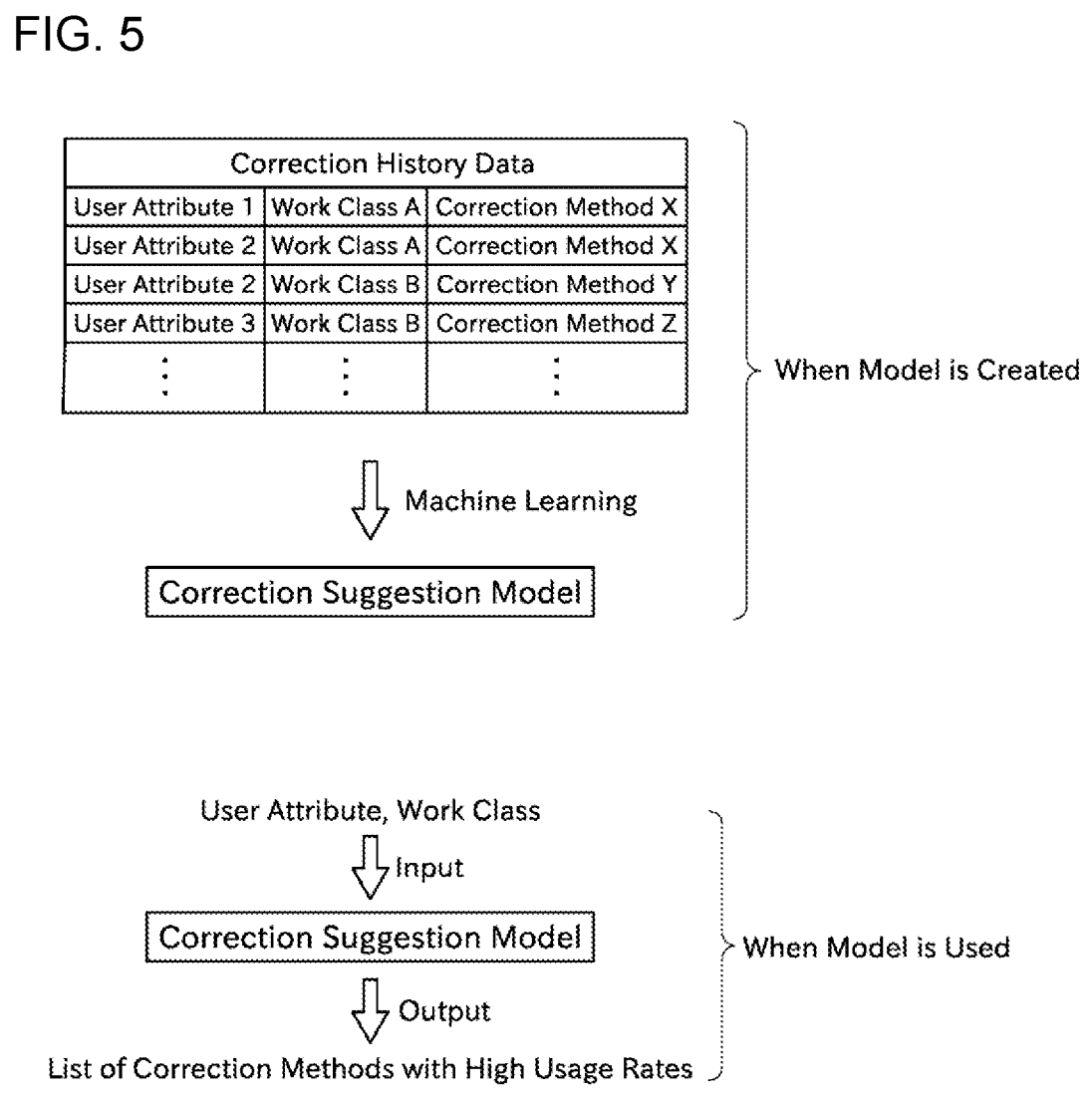

| Correction History Data | | |
|---|---|---|
| User Attribute 1 | Work Class A | Correction Method X |
| User Attribute 2 | Work Class A | Correction Method X |
| User Attribute 2 | Work Class B | Correction Method Y |
| User Attribute 3 | Work Class B | Correction Method Z |
| ⋮ | ⋮ | ⋮ |

⇩ Machine Learning

Correction Suggestion Model

When Model is Created

User Attribute, Work Class

⇩ Input

Correction Suggestion Model

⇩ Output

List of Correction Methods with High Usage Rates

When Model is Used

| Correction History Data ||
|---|---|
| Work Class A | Correction Method X |
| Work Class A | Correction Method X |
| Work Class B | Correction Method Y |
| Work Class B | Correction Method Z |
| ⋮ | ⋮ |

| | |
|---|---|
| Work Class A | Correction Method X [80%], Correction Method Y [10%], Correction Method Z [10%] |
| Work Class B | Correction Method X [20%], Correction Method Y [70%], Correction Method Z [10%] |
| ⋮ | ⋮ |

ROBOT DATA PROCESSING SERVER AND ROBOT PROGRAM CALCULATION METHOD

TECHNICAL FIELD

The present invention relates primarily to a robot data processing server for processing data on an industrial robot.

BACKGROUND ART

Patent Literature 1 (PTL 1) discloses a production system including more than one industrial machines that operate in accordance with an operation program. The operation of the production system is optimized by a cell controller. More specifically, the cell controller analyzes what has an adverse effect on a tact time of the production system based on time-series running information obtained from the production system, and improves the operation program. The information obtained by the cell controller is transmitted to a cloud server. This allows the information to be shared among two or more cell controllers. PTL 1 also mentions an industrial robot as an example of the industrial machine.

CITATION LIST

Patent Literature

PTL 1: Japanese Patent Application Laid-Open No. 2017-199077

SUMMARY OF INVENTION

Technical Problem

In order to have an industrial robot perform a work, it is necessary to teach work contents in advance. Teaching method includes an offline teaching method and an online teaching methods, for example. The offline teaching method is a method of arranging three-dimensional data of a workshop and three-dimensional data of the industrial robot in a virtual space, and teaching work contents while operating the industrial robot in the virtual space. The online teaching method is a method of arranging the industrial robot at an actual workshop, and teaching work contents while actually operating the industrial robot by using a teaching pendant. Teaching points are set by teaching the industrial robot by using the offline teaching method or the online teaching method. The teaching point is a point for determining a position and posture of the industrial robot to the operation program. It however is difficult to prepare the result data at a single work location.

However, during the actual work, an environment of the workshop is not always the same as during teaching. For example, the shape of the workpiece during the actual work may be slightly different from the shape of the workpiece during teaching. The position of the workpiece during the actual work may differ slightly from the position of the workpiece during teaching. As a method for dealing with errors between the actual work and teaching, a correction program have been conventionally used to match teaching points to the actual environment of the workshop. However, since there are many types of correction methods, it is difficult to deal with the various correction methods from the point of view of both the skill of an operator and a software.

Solution to Problem

The present invention has been made in view of the circumstances described above, and aims primarily to provide a mechanism for easily creating a correction program of correcting teaching points using a correction method desired by a user.

The foregoing has described problems to be solved by the present invention. The following will describe solutions to the problems and advantageous effects thereof.

A first aspect of the present invention provides a robot data processing server configured as follows. The robot data processing server includes a communication device, storage device, and a processing unit. The communication device receives teaching points of an industrial robot from an external device by communicating with the external device via a wide area network. The storage device stores correction method data including a plurality of types of correction methods for correcting the teaching points according to a positional relationship between the robot and a workpiece during a work. The processing unit creates a correction program by applying the correction method described in the correction method data to the teaching points received by the communication device, and instructs the communication device to transmit the correction program to the external device.

A second aspect of the present invention provides a method for creating a correction program. That is, in the method, teaching points of an industrial robot is received from an external device by communicating with the external device via a wide area network. A correction method is selected from correction method data including a plurality of types of correction methods for correcting the teaching points according to a positional relationship between the robot and a workpiece during a work, and a correction program is created by applying the correction method to the received teaching points. The created correction program is transmitted to the external device.

Advantageous Effect of Invention

According to the present invention, a robot processing server that offers trajectory data for an operation program with a high accuracy can be provided.

BRIEF DESCRIPTION OF DRAWINGS

FIG. 1 An outline drawing showing a robot service provider system

FIG. 4 A diagram showing a window for accepting selection of a correction program.

FIG. 5 A diagram for explanation of creation and use of a correction suggestion model FIG. 6 A diagram showing a process of creating a correction program from a correction template.

DESCRIPTION OF EMBODIMENTS

Figure 2:
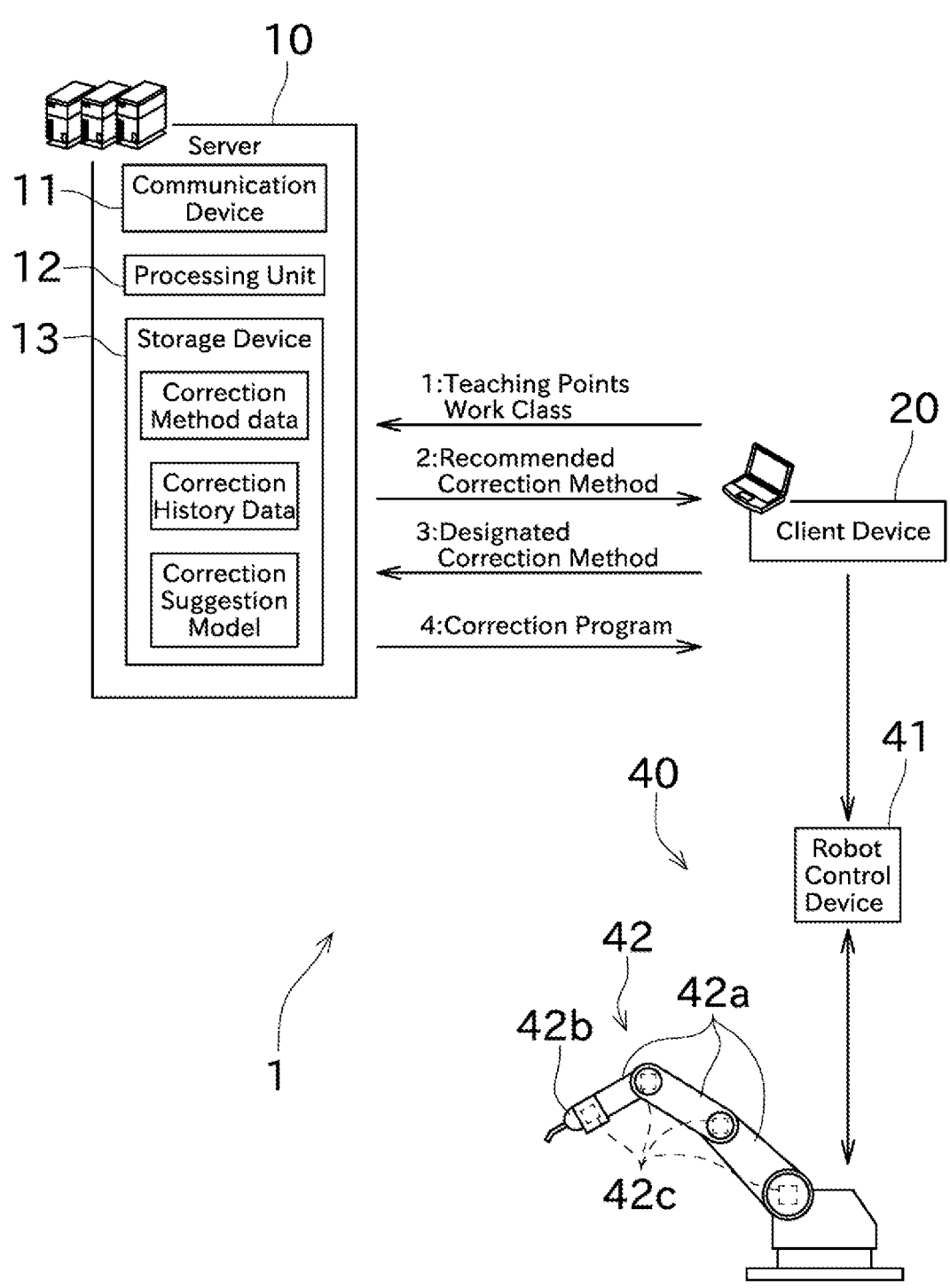
FIG. 2 A block diagram showing a server, a client device, and a robot system

The following will describe, with reference to the drawings, an embodiment of the present invention. First, referring to FIG. 1, an outline of a robot service provider system 1 will be described.

The robot service provider system 1 is a system that aggregates information provided by companies involved in an industrial robot, and provides various services to the respective companies.

The industrial robot refers to a robot that works at a workshop in a factory, a warehouse, or the like. The industrial robot is of teaching playback type. The teaching playback type means: teaching in advance an operation of the industrial robot; and having the industrial robot repeat the same operation in accordance with what has been taught. The industrial robot is, for example, a vertical-articulated or horizontal-articulated arm robot. The robot service provider system 1 is applicable to a robot other than arm robots, such as a parallel link robot. Examples of works performed by the industrial robot include assembling, welding, coating, machining, or transporting. Hereinafter, the industrial robot will be simply referred to as "robot."

As shown in FIG. 1, the companies involved in the industrial robot include a robot manufacturer, a robot user, a related manufacturer, an introduction support company, and the like. The robot manufacturer develops, manufactures, and maintains the robot. The robot user introduces the robot to its own workshop, and makes the robot work. The related manufacturer is, for example, a manufacturer for manufacturing peripheral equipment such as a work tool or a sensor. The related manufacturer may encompass a manufacturer that provides software for teaching or managing the robot, for example. The introduction support company, which is a so-called system integrator, supports the robot user in introducing the robot. To be specific, the introduction support company selects a robot suitable for the workshop of the robot user, teaches the robot, or suggests a change for the better after the introduction, for example.

As shown in FIG. 1, the robot service provider system 1 includes a server 10 and client devices 20.

The server 10 and the client devices 20 are at different locations. The server 10 and the client devices 20 are mutually communicable via a wide area network. The wide area network is the Internet for example, but may be something other than the Internet. Examples of the something other than the Internet include a network in which local area networks at different locations are connected by a dedicated line.

The server 10 is a robot data processing server, which aggregates information relating to the robot, and provides later-described services to the respective companies. The server 10 is installed in a data center, for example. The server 10 may be a single piece of hardware, or may be composed of two or more pieces of hardware in cooperation with each other. For example, a piece of hardware that aggregates and stores information may be separate from a piece of hardware that executes a process in accordance with a request from the client device 20. The server 10 may be implemented by a cloud computing service.

The client devices 20 are installed in the robot manufacturer, the robot user, the related manufacturer, and the introduction support company, respectively. The client devices 20 are general-purpose PCs, on which software for using the robot service provider system 1 is installed. This software will hereinafter be called a "robot running support application." The client devices 20 do not always have to be general-purpose PCs, but may be dedicated products exclusively for use of the robot service provider system 1. The client devices 20 do not always have to be PCs, but may be tablet devices or smartphones. The client devices 20 may be installed with software different from the robot running support application, which more specifically is teaching software provided by the related manufacturer.

In the following, descriptions will be given in a simplified fashion: for example, the client device 20 provided in the robot manufacturer transmitting data to the server 10 is expressed as the robot manufacturer transmitting data to the server 10.

Information transmitted and received in the robot service provider system 1 will now be described. The information illustrated below is just an example, and information other than the below-described one may be transmitted and received.

The robot manufacturer transmits to the server 10 a computation tool and specifications of the robot that the robot manufacturer manufactures, for example. The specifications of the robot include the size of the robot, a movable range of an arm, a speed range of the arm, and the like. The specifications of the robot are transmitted in association with a model type of the robot. The computation tool is, for example, software that makes the robot operate in accordance with an operation program, or software for teaching the robot.

The robot user transmits to the server 10 data accumulated through running of the robot. The data include, for example, the operation of the robot in accordance with the operation program, a cycle time, or a location where a failure occurs. The robot user is capable of receiving production support data from the server 10. The production support data are data that are used when the robot is introduced or operated, and the production support data are data relating to the peripheral equipment or the work tool, or are a program necessary to introduce the robot or to add a work, for example.

The related manufacturer transmits to the server 10 specifications of the peripheral equipment of the robot, a driver of the peripheral equipment, a program for linking the peripheral equipment to the robot, or software. The related manufacturer, when the driver or the software is updated, transmits an update file to the server 10.

The introduction support company receives various data that the server 10 has received from other companies. The introduction support company can make use of these data when supporting the robot user in introducing the robot.

Services provided by the robot service provider system 1 will be briefly described below.

The server 10 provides a virtual place serving as a cloud platform, to facilitate collaboration of companies. The server 10 has a data sharing function, a data accumulating function, and a data analysis function. The data sharing function is a function that allows data received by the respective companies to be shared among the companies. The data sharing function is a function that allows data received by the respective companies to be shared among the companies. The data analysis function is a function for analyzing data accumulated by the data accumulating function, and creating new information. The analysis of data is preferably carried out by using an AI, for example. The robot service provider system 1 provides services through these functions.

Services that the robot service provider system 1 provides in an introduction of the robot include a trajectory data creation service, a correction program creation service, an operation path creation service, an introduction data sharing service, a software cooperation service, a program library service, and a robot introduction AI support service. Each company receives these services through the robot running support application installed on its client device 20 or a browser software installed on the client device 20.

The trajectory data creation service is a service of the server 10 creating trajectory data. First, the robot user or the introduction support company transmits an operation program to the server 10. The server 10 creates trajectory data for the received operation program, and transmits the trajectory data to the robot user or the introduction support company. The operation program is data in which operations to be performed by the robot are described in a sequential order. To be specific, the operation program includes a teaching point at which the robot is to be positioned, and the speed and acceleration of movement of the arm. In a case where an operation of the robot is triggered by an operation of another device, the operation program includes a condition related to an operation timing. The trajectory data are operations of the robot from one time to another. Use of data accumulated in the server 10 allows the trajectory data to be calculated with a high accuracy.

The correction program creation service is a service of the server 10 creating a correction program. First, the robot user or the introduction support company transmits a teaching point and a work class to the server 10. The work class refers to a kind of the work performed by the robot, such as assembling or welding. In a case of the welding, it may be possible to further set a kind of the welding, a kind of a workpiece, or the like. The server 10 creates a correction program based on the teaching point and the work class received, and transmits the correction program to the robot user or the introduction support company. The correction program is a program used to correct an error between an actual work and a teaching. Use of data accumulated in the server 10 makes it possible to propose an appropriate correction method to the robot user or the introduction support company. Note that details of the correction program creation service will be described later.

The operation path creation service is a service of the server 10 creating an operation path. First, the robot user or the introduction support company creates interference data. The interference data are data in which plural teaching points are each associated with whether or not the robot interferes with another object when the position and posture of the robot are aligned to the teaching point. The robot user or the introduction support company transmits the interference data to the server 10. The server 10 creates an operation path based on the interference data. The operation path is data in which teaching points of the robot are sequenced in time series. Use of data accumulated in the server 10 allows creation of an appropriate operation path.

The introduction data sharing service is a service that facilitates sharing of introduction data among companies, the introduction data being used when the robot is introduced to the robot user. The introduction data include data on the workshop of the robot user, data on the workpiece, data on work details, data on the operation program, a control program for the peripheral equipment, or the like. The introduction data are saved in the server 10, and are accessed by the robot user or the introduction support company. Consequently, sharing of the introduction data is facilitated.

The software cooperation service is a service that enables pieces of software provided by various companies to cooperate together. The server 10 runs a piece of software provided by the robot manufacturer in cooperation with a piece of software provided by the related manufacturer. In this manner, the robot and the peripheral equipment can be linked easily. Linking a piece of teaching software provided by the robot manufacturer to a piece of teaching software provided by someone other than the robot manufacturer allows an effective use of the advantages of the two kinds of teaching software.

The program library service is a service that stores programs provided by various companies as a library so that they can be shared among the companies. For example, to create an operation program that needs use of a special work tool or an operation program that needs sensing, a force sense control, or the like, a skill is required. In this respect, by the program library service, an operation program that can be used for general purposes is stored as a library in the server 10. This enables the robot user or the introduction support company to easily create the above-mentioned kinds of operation programs.

The robot introduction AI support service is a service for supporting an introduction of the robot by using an AI when the robot user introduces the robot. As described above, when the robot user introduces the robot, the robot service provider system 1 provides various services to the robot user. The server 10 accumulates data obtained in providing the services, and analyzes the data. More specifically, the server 10 makes the data machine-learned. Accordingly, when a new robot user introduces the robot, a proposal can be made to the new robot user based on a tendency of the robot model type, the peripheral equipment, the operation program, or the like, adopted by previous robot users.

Functions that the robot service provider system 1 has in order to appropriately supply the foregoing services will now be briefly described.

Data shared in the server 10 include highly confidential data. For example, data on the workshop of the robot user and data on the workpiece can sometimes be highly confidential. Shared data may possibly include customer information and technology information of each company. This is why the robot service provider system 1 has a security function for preventing leakage of highly confidential data.

In some case, the robot running support application may be used to build a virtual environment including a workshop, a workpiece, a robot, and the like, for observation of an introduction of the robot or running of the robot. In this case, it is preferable that the virtual environment on the robot running support application is always kept coincident with an environment of an actual machine in the workshop. This is why the robot running support application has a function for enabling the virtual environment to be built or updated easily.

The robot service provider system 1 provides a wide variety of services. These services are provided through the robot running support application. The robot running support application, therefore, has a user interface that can facilitate performing functions desired by an operator.

The server 10 accumulates various data. If, for example, all of data about the introduction of the robot are transmitted to the server 10, not only the security problem mentioned above but also a problem of an enlarged communication data amount and an enlarged server capacity can arise. The robot service provider system 1, therefore, has a function for extracting only data related to providing of services and/or for reducing the size of data not related to providing of services, instead of transmitting all of the data about the introduction of the robot.

Configurations of the server 10, the client device 20, and a robot system 40 will now be described with reference to FIG. 2.

The server 10 includes a communication device 11, a processing unit 12, and a storage device 13. The communication device 11, which for example is a communication module, communicates with the client device 20, or the like, as an external device. The processing unit 12, which for example is a CPU, executes various processes by executing a program. The storage device 13, which is a hard disk or an SSD, stores various data including the foregoing program.

The processes performed by the processing unit 12, and the data stored in the storage device 13 will be detailed later.

The client device 20 is provided in each of the companies, and is installed with the robot running support application, as described above. The client device 20, like the server 10, includes a communication device, a processing unit, and a storage device. The client device 20 further includes a display device and an input device. The display device, which is a liquid crystal display or an organic electroluminescent display, displays an image created by the processing unit. The input device, which is a mouse, a keyboard, a touch panel, or the like, receives a human operation.

The client device 20 transmits to the robot system 40 an operation program that the client device 20 has created or an operation program that the client device 20 has received from the server 10. The robot system 40 includes a robot control device 41 and a robot 42.

The robot control device 41 includes a processing unit such as a CPU, and a storage device such as a hard disk, an SSD, or a flash memory. The processing unit executes a program stored in the storage device, to control the robot 42.

The robot 42 includes plural arms 42*a*, a work tool 42*b*, and sensors 42*c*. The arms 42*a* are individually operated by power of an actuator such as a motor. The work tool 42*b* performs a work on a workpiece. The work tool 42*b* is, for example, a hand for holding the workpiece, or a welding torch for welding the workpiece. The sensors 42*c* detect the rotation angles of the respective arms 42*a*, and output detection results to the robot control device 41.

With the above-described configuration, the robot control device 41 controls the actuator based on the operation program and the rotation angles detected by the sensors 42*c*, to operate the arms 42*a* and/or to make the work tool 42*b* perform the work.

The correction program creation service will now be described in detail with reference to FIG. 2 to FIG. 6.

The robot user and introduction support company, etc., register in advance to receive services from the robot service provider system 1. Items to be registered include a company name and the like as well as user attribute. The user attribute is an item for classifying the type of company that uses the robot service provider system 1. The user attribute include, for example, classification items such as a robot user, an introduction support company, a related manufacturer, or a robot manufacturer, and, if the robot user is a manufacturer, a technical field thereof, etc is also included. As described later, the robot service provider system 1 may provide services using user attributes.

The correction program creation service is used by a person belonging to the robot user or the introduction support company. Hereinafter, users of the correction program creation service will be simply referred to as users. As described above, the correction program creation service is a service in which the server 10 creates the correction program based on the teaching points and the work class sent by the client device 20 and sends the correction program to the client device 20. The correction program is a program for correcting the teaching point according to the positional relationship between the robot 42 and the workpiece during the actual work. In other words, the correction program is a program for correcting errors between the actual work and teaching. The correction program is created based on the teaching points. There are many methods for creating the correction program based on the teaching points. Hereinafter, this method will be referred to as a correction method.

The user creates teaching points using an offline teaching method by the robot running support application. Specifically, the client device 20 arranges, in a virtual space, three-dimensional data on the workshop, three-dimensional data on the robot, and three-dimensional data on the workpiece. Next, the teaching points are created in accordance with the flow of the work performed by the robot 42 based on the content of the work performed by the robot 42 to the workpiece. The teaching point is a point that determines the position and the posture of the robot 42. The position and posture of the robot 42 are, for example, the position of the robot 42, the rotation angle of each arm 42*a*, the position of the work tool 42*b*, the posture of the work tool 42*b*, and the like. The process of creating teaching points may be performed as one step of the process of creating an operation program. Instead of the offline teaching method, teaching points may be created using the online teaching method described above.

Figure 3:
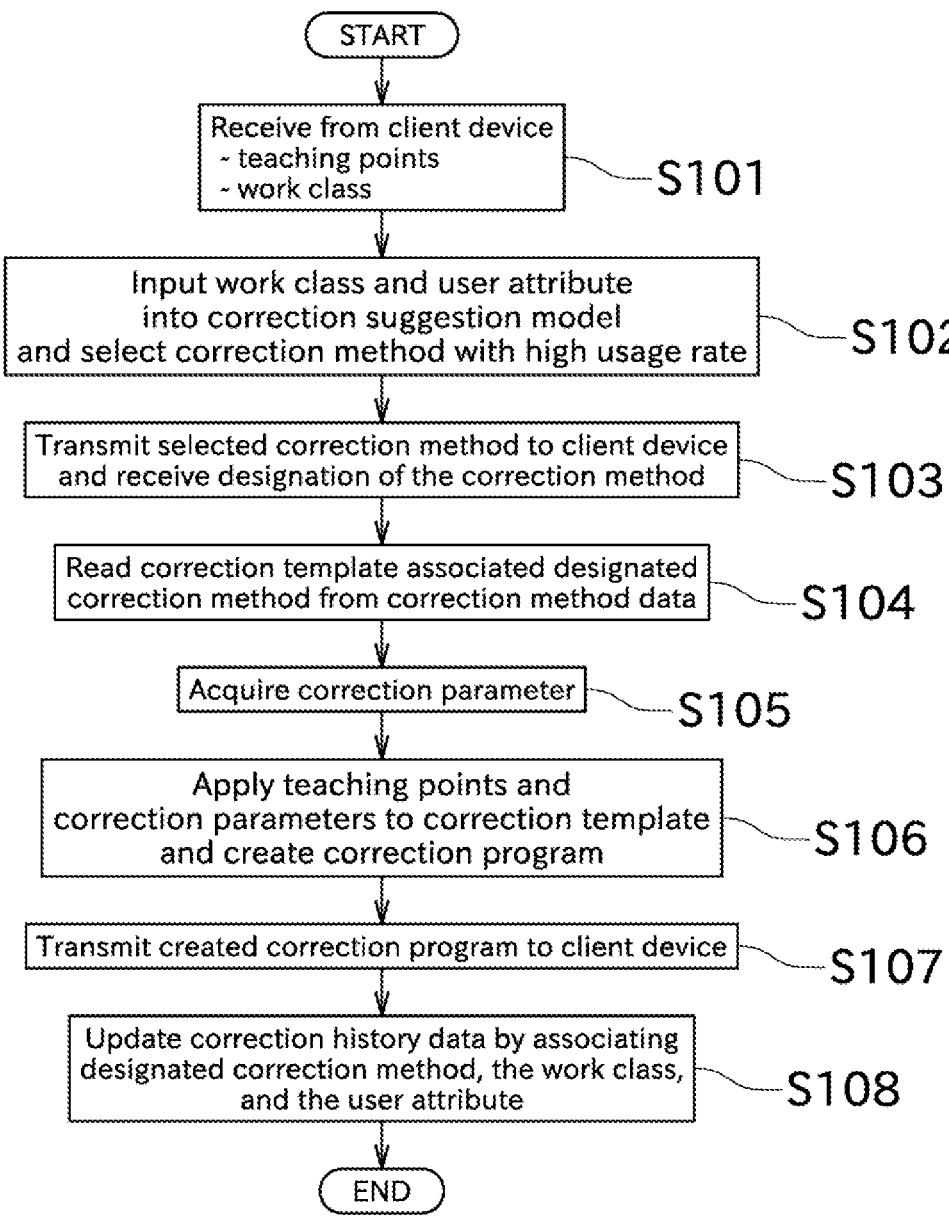
FIG. 3 A flowchart of a correction creation service

In the following, a specific process performed by the server 10 will be described according to a flowchart related to the server 10 shown in FIG. 3. When the teaching points is referred below, it is not a single teaching point, but a set of teaching points arranged in chronological order to perform a series of the work.

The server 10 receives the teaching points and the work class from the client device 20 (S101). Receiving teaching points means receiving data including the teaching points. That is, the server 10 may receive data in which only teaching points are described, or may receive data including teaching points such as an operation program. The work class is the type of work performed by the robot 42, as described above.

Transmission of the teaching points and the work class from the client device 20 to the server 10 is performed, for example, as follows. First, the user operates the client device 20 to instruct the use of the correction program creation service. Thereby, as shown in FIG. 4, the correction program creation tool screen 30 is displayed on the display device of the client device 20. The correction program creation tool screen 30 may be a screen created by the functions of the client device 20 or may be a screen created by the functions of the server 10. The correction program creation tool screen 30 includes a teaching point designation box 31 and a work class designation box 32.

The user operates the teaching point designation box 31 to designate the teaching points for which the correction program is desired to be created from the list of the teaching points. Next, the user operates the work class designation box 32 to designate the relevant work class from the list of the work class. The relevant work class is a work class to be performed by using the teaching points specified in the teaching point designation box 31. Work class that can be specified in the work class designation box 32 are created in advance and registered in the robot running support application of the client device 20. The same work class is also registered in the server 10. After the teaching points and the work class are designated, the confirmation button 33 is operated to transmit the teaching point and the work class to the server 10.

There are various methods for transmitting the teaching points and the work class from the client device 20 to the server 10. For example, if the work class have been designated when the user creates the teaching points by the client device 20, the association between the teaching point and the work class has already been completed. In this case, when the user simply designate teaching points, the associated work class may be automatically designated, and the teaching points and the work class may be transmitted to the server 10.

Three-dimensional data of the workshop and three-dimensional data of the workpiece are not transmitted from the client device 20 to the server 10. Since the data is highly confidential, the transmission of the data to the server 10 may be undesirable in view of a security perspective. Furthermore, since the three-dimensional data is large in size, amount of communication data increases. In this respect, the three-dimensional data is not essential for creating the correction program. Therefore, by not transmitting the three-dimensional data to the server 10 but instead transmitting teaching points, security can be increased and the amount of communication data can be further reduced.

Next, the server 10 inputs the work class and user attribute into the correction suggestion model and selects the correction method with a high usage rate (S102). The server 10 can access registration information of the user who uses the correction creation service and acquire the user attribute of the user. The user may also send the user attribute similar to the teaching points and the work class.

As shown in FIG. 5, the correction suggestion model is a model constructed by machine learning of correction history data. The correction history data is data in which corrections performed in the past are classified and stored. Specifically, the correction history data is data that associates user attributes, work classes, and correction methods. By performing machine learning on the correction history data, it is possible to recognize the correlation between user attributes, work classes, and correction methods. In other words, it is possible to construct the correction suggestion model based on tendency of performing the correction by using what kind of correction methods, when what type of user selects what type of the work class.

As shown in FIG. 5, when using the correction suggestion model, the user attribute and the work class are input to the correction suggestion model. The output of the correction suggestion model is a list of correction methods with high usage rates. As described above, since the correction suggestion model has learned the user attributes, the work classes, and the correction methods, the correction method that is highly correlated with the input user attribute and the work class is output. In this embodiment, a plurality of correction methods are output in order of high correlation, and the server 10 selects one or more correction methods in order of high correlation. The user attributes of the user is not essential, and may be omitted from the machine learning targets. Alternatively, another item may be added to the machine learning target.

Next, the server 10 transmits the correction methods selected based on the output of the correction suggestion model to the client device 20, and receives the designation of the correction method (S103). The client device 20 presents the received correction methods to the user. For example, as shown in FIG. 4, the client device 20 displays a correction target box 34 and a correction suggestion box 35 on the correction program creation tool screen 30. The correction target box 34 displays the teaching points and the work class which are targets for creating the correction program. The contents displayed in the correction target box 34 are the same as the information designated by the user by using the teaching point designation box 31 and the work class designation box 32. In the correction suggestion box 35, the correction methods output by the correction suggestion model are displayed in order of high correlation. The user designates the correction method for creating the correction program from the displayed list of correction methods.

The correction suggestion box 35 may further display not only the name of the correction methods, but also the specific content, parameter, or the like of the correction method. In this embodiment, a plurality of correction methods are proposed, but it is also possible to propose one correction method having the highest correlation and receive permission from the user.

When the user operates the client device 20 to designate the correction method, the designated correction method is transmitted to the server 10. The server 10 reads a correction template associated with the designated correction method from the correction method data (S104). The correction method data is data that associates correction methods executable by the server 10 with correction templates.

Figure 6:
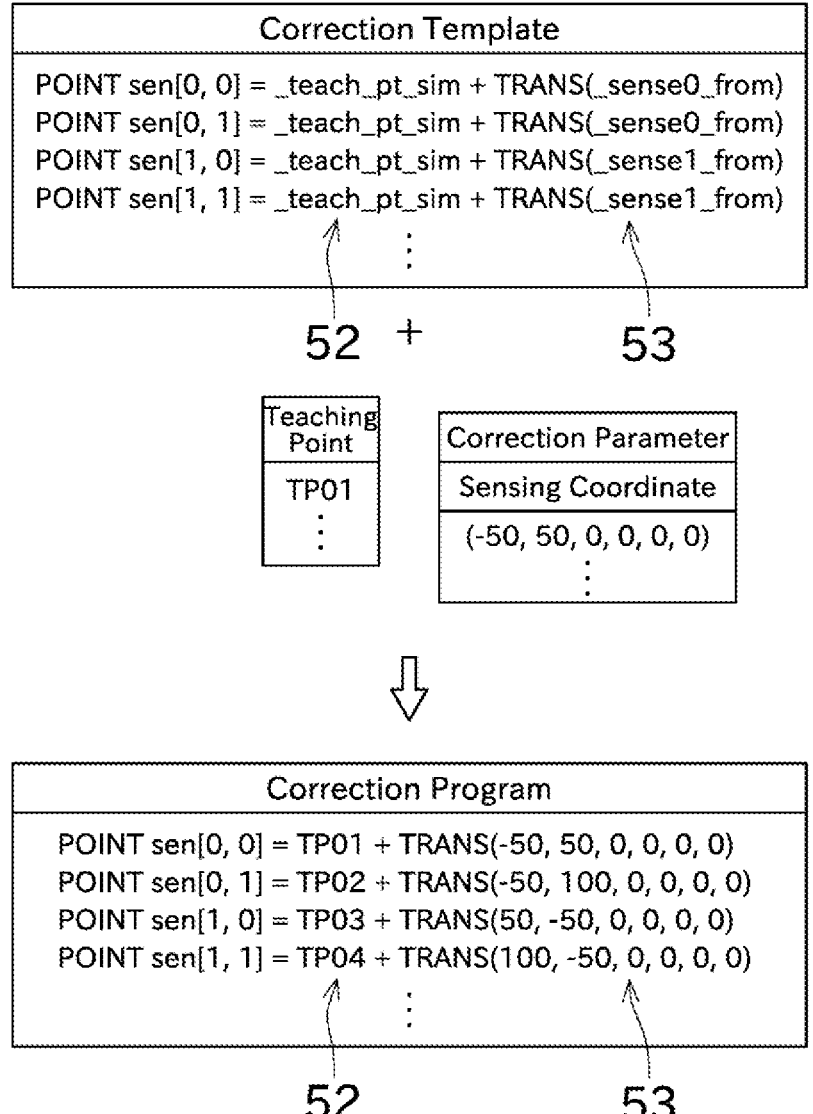

The correction template is data for easily creating the correction program. As shown in FIG. 6, the correction template includes a teaching points 52 and correction terms 53. The teaching points 52 are terms for inputting the teaching points created at the time of teaching. The correction terms 53 are terms for inputting information such as values or conditions required other than the teaching points, such as information related to sensors. For example, when a error is corrected based on a value detected by a sensor, the correction term 53 is a value based on the detected value of the sensor. In the following, such information will be referred to as a correction parameter. The correction parameter is not limited to information regarding the sensor, and may be any condition for determining the correction term 53, for example.

The information about the teaching points had by the robot 42 is different, and the settings of the correction parameters need to be changed in consideration of the situation in which the correction is to be performed, such as the error range. The correction template has input items of the teaching points 52 and the correction terms 53, so that the correction program can be easily created while handling changes in the teaching points and the correction parameters.

Depending on the designated correction method, it is necessary to input information regarding the sensor to the correction terms 53. If the correction parameter is necessary, the server 10 acquires the correction parameter (S105). For example, the server 10 displays a screen for inputting correction parameters on the correction program creation tool screen 30, and requests the user to input the correction parameter. Alternatively, the server 10 may request input of correction parameters when designating the correction method.

Next, the server 10 applies the teaching points and correction parameters to the correction template to create the correction program (S106). As shown in FIG. 6, the correction program is created by inputting the teaching points and correction parameters into the correction template. Generally, the act of creating a correction program requires skill of the user. In particular, since there are many types of correction methods, it is difficult for users to handle all of them. In this regard, by using the correction template, the correction program can be easily created regardless of the skill of the user.

By storing the correction method data in the client device 20, the problem of skill of the user can be solved. However, since there are many types of correction methods, user is required to have high skill in order to designate an appropriate correction method. Furthermore, when a new correction method is added, the correction method data of all client devices 20 must be updated in order to use the new correction method. In this regard, in this embodiment, many users of the robot service provider system 1 can use the new correction method simply by updating the correction method data of the server 10. Therefore, in the robot service provider system 1, the correction method data is stored in the server 10.

Next, the server 10 transmits the created correction program to the client device 20 (S107). The user uses the correction program received from the server 10 to have the robot 42 perform the work. Thereby, the robot 42 performs work while correcting errors during actual work and teaching.

Next, the server 10 updates the correction history data by associating the designated correction method, the work class, and the user attribute (S108). The server 10 performs additional learning at an appropriate timing using the updated correction history data or the newly acquired correction history data as learning data, and updates the correction suggestion model. This makes it possible to suggest a more appropriate correction method.

In this embodiment, the server 10 presents the correction method and creates the correction program using the correction method specified by the user. Alternatively, the user may be able to designate the correction method when transmitting the teaching points. For example, the correction method designation box may be displayed on the correction program creation tool screen 30 so that the user can designate an executable correction method using the correction method data. When the correction method is designated by the client device 20, the server 10 creates the correction program using the designated correction method. If the correction method is not designated by the client device 20, the server 10 suggests the correction method in the same manner as in this embodiment. Thereby, for example, if an appropriate correction method can be designated based on the user's experience, the user's effort and the processing load on the server 10 can be reduced. Even in this case, since the correction template can be used, the user's effort can be reduced compared to when the user creates the correction program by himself.

Alternatively, after acquiring the correction method with the highest usage rate in step S102, the server 10 creates the correction program using the correction method with the highest usage rate and transmits the correction program to the client device 20, before suggesting the correction method to the user. This saves the user the trouble of selecting the correction method. When the correction program is transmitted, the user may be asked whether or not the user wishes to change the correction method.

Figure 7:
FIG. 7 A diagram for explanation of calculating usage rate of correction methods by data analysis from correction history data.

In this embodiment, the correction method is suggested using the correction suggestion model, but constructing the model by machine learning is not essential. Instead of constructing the model, the correction method may be suggested by using data analysis. For example, as shown in FIG. 7, if the correction history data exists, the usage rate of the designated correction method is calculated for each work class. Then, when the work class is designated, the server 10 suggests the correction method with the high usage rate based on the results of the data analysis.

As thus far described above, the server 10 of this embodiment includes the communication device 11, storage device 13, and the processing unit 12. The communication device 11 receives the teaching points of the industrial robot 42 from the client device 20 by communicating with the client device 20 via the wide area network. The storage device 13 stores the correction method data including a plurality of types of the correction methods for correcting the teaching points according to the positional relationship between the robot 42 and the workpiece during the work. The processing unit 12 creates the correction program by applying the correction method described in the correction method data to the teaching points received by the communication device 11, and instructs the communication device 11 to transmit the correction program to the client device 20. In this embodiment, the correction program creation method is performed by the above-mentioned processes.

Accordingly, the user of the client device 20 obtains the correction program simply by transmitting the teaching points to the robot service provider system 1. In particular, the robot service provider system 1 stores correction method data in which a plurality of types of correction methods are described. Therefore, the user can obtain a correction program using a desired or appropriate correction method.

In the server 10 of this embodiment, the processing unit 12 receives a designation of the correction method. The processing unit 12 applies the designated correction method to the teaching points to create the correction program.

Accordingly, the user creates the correction program by using the desired correction method.

In the server 10 of this embodiment, the storage device 13 stores the correction history data in which the correction methods performed in the past are associated with the work classes. The processing unit 12 receives designation of the work class to be performed by the robot 42. The processing unit 12 presents the designated correction method based on the designated work class and the correction history data.

Thereby, the correction method with high validity can be suggested to the user.

In the server 10 of this embodiment, the processing unit 12 selects one or more correction methods associated with the designated work class using the correction suggestion model which is a model constructed by machine learning at least on the correction history data, and is a model in which the work class is input data and the correction method is output data, and presents the selected correction method.

Accordingly, a more appropriate correction method can be suggested to the user. In particular, when the data input to the model is diverse and cannot be determined uniquely, a highly valid correction method can be suggested to the user.

In the server 10 of this embodiment, the processing unit 12 performs additional learning using the designated work class and the correction method to update the correction suggestion model.

This can improve the probability that the appropriate correction method will be proposed by the correction suggestion model.

In the server 10 of this embodiment, the processing unit 12 refers to the correction history data and selects one or more correction methods based on the height of the designated ratio for the designated work class, and propose the selected correction method.

Thereby, it is possible to suggest a highly appropriate correction method to the user while omitting the process of constructing a model.

In the server 10 of this embodiment, the correction method data includes the correction template for each correction method. The processing unit 12 creates the correction program by inputting teaching points into the correction template associated with the designated correction method.

Thereby, the correction program can be created based on the teaching points and the correction template, so the correction program can be created without receiving three-dimensional data and the like of the workpiece from the client device 20.

In the server 10 of this embodiment, the communication device 11 communicates via the Internet with the client devices 20 disposed in plural facilities, respectively.

This allows multiple facilities to share the robot data processing server.

While a preferred embodiment of the present invention has been described above, the configurations described above may be modified, for example, as follows.

The flowchart illustrated in the embodiment described above is just an example, and it may be acceptable that a part of the process is omitted, contents of a part of the process are changed, or a new process is added.

The server 10 according to the embodiment described above is installed in the data center, but in a case where, for example, the robot manufacturer provides the robot service provider system 1, the server 10 may be installed in the robot manufacturer.

The functionality of the elements disclosed herein may be implemented using circuitry or processing circuitry which includes general purpose processors, special purpose processors, integrated circuits, ASICs (Application Specific Integrated Circuits), conventional circuitry and/or combinations thereof which are configured or programmed to perform the disclosed functionality. Processors are considered as processing circuitry or circuitry as they include transistors and other circuitry therein. In the disclosure, the circuitry, units, or means are hardware that carry out the recited functionality, or are hardware programmed to perform the recited functionality. The hardware may be any hardware disclosed herein or otherwise may be other known hardware which is programmed or configured to carry out the recited functionality. When the hardware is a processor which may be considered as a type of circuitry, the circuitry, means, or units are a combination of hardware and software, the software being used to configure the hardware and/or processor.

The invention claimed is:

1. A system comprising:

a client device configured to receive a user designation of (i) teaching point data from among a plurality of teaching point data, (ii) a work class, and (iii) a correction method from one or more correction methods;

a robot system including a robot control device and an industrial robot, the robot control device being configured to control the industrial robot based on a correction program; and a robot data processing server including:

a communication device configured to receive the designated teaching point data and the designated work class from the client device via a wide area network;

a storage device configured to store correction method data including the one or more correction methods for correcting the designated teaching point data according to a positional relationship between the industrial robot and a workpiece during a work, the correction method data including a correction template for each correction method; and a processing unit configured to:

select the one or more correction methods based on the designated work class;

transmit the selected one or more correction methods to the client device;

receive the designated correction method from the client device;

create the correction program by inputting the designated teaching point data into a correction template associated with the designated correction method; and transmit the correction program to the client device, wherein the client device transmits the correction program to the robot control device, and the robot control device controls the industrial robot based on the correction program to correct teaching points included in the designated teaching point data during the work.

2. The system according to claim 1, wherein the storage device further stores correction history data in which correction methods performed in the past are associated with work classes, and the processing unit selects the one or more correction methods based on the designated work class and the correction history data.

3. The system according to claim 2, wherein the processing unit selects the one or more correction methods associated with the designated work class using a correction suggestion model which is a model constructed by machine learning at least on the correction history data, and is a model in which the work class is input data and the correction method is output data.

4. The system according to claim 3, wherein the processing unit performs additional learning using the designated work class and the correction method to update the correction suggestion model.

5. The system according to claim 2, wherein the processing unit refers to the correction history data, calculates usage rates of correction methods for the designated work class, and selects one or more correction methods based on the calculated usage rates, and suggests the selected one or more correction methods.

6. The system according to claim 1, wherein the communication device communicates via the Internet with the client device arranged in plural facilities, respectively.

7. A method comprising:

receiving, at a client device, a user designation of (i) teaching point data from among a plurality of teaching point data and (ii) a work class;

transmitting the designated teaching point data and the designated work class from the client device to a robot data processing server via a wide area network;

selecting, by the robot data processing server, one or more correction methods based on the designated work class from correction method data stored in the robot data processing server, the correction method data including a correction template for each correction method;

transmitting the selected one or more correction methods from the robot data processing server to the client device;

receiving, at the client device, a user designation of a correction method from the selected one or more correction methods;

transmitting the designated correction method from the client device to the robot data processing server;

creating, by the robot data processing server, the correction program by inputting the designated teaching point data into a correction template associated with the designated correction method;

transmitting the correction program from the robot data processing server to the client device;

transmitting the correction program from the client device to a robot control device; and controlling, by the robot control device, an industrial robot based on the correction program to correct teaching points included in the designated teaching point data during a work.

* * * * *